E. & D. MOORE.
PACKING FOR MILL-SPINDLES.
No. 187,663.                 Patented Feb. 20, 1877.
*Fig. 1.*
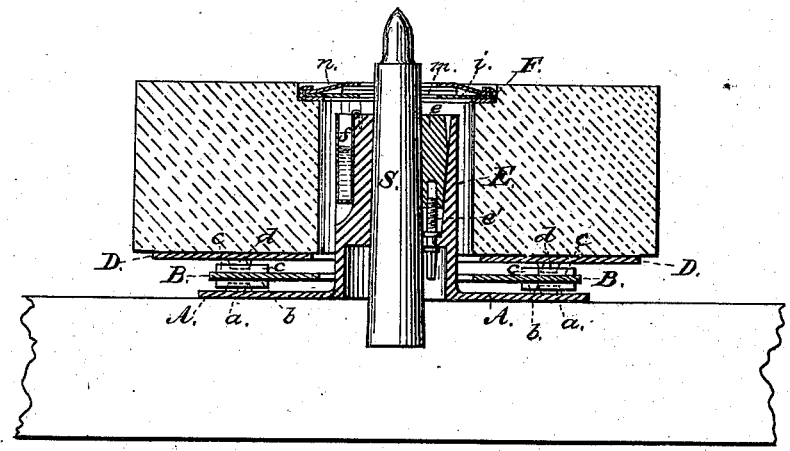
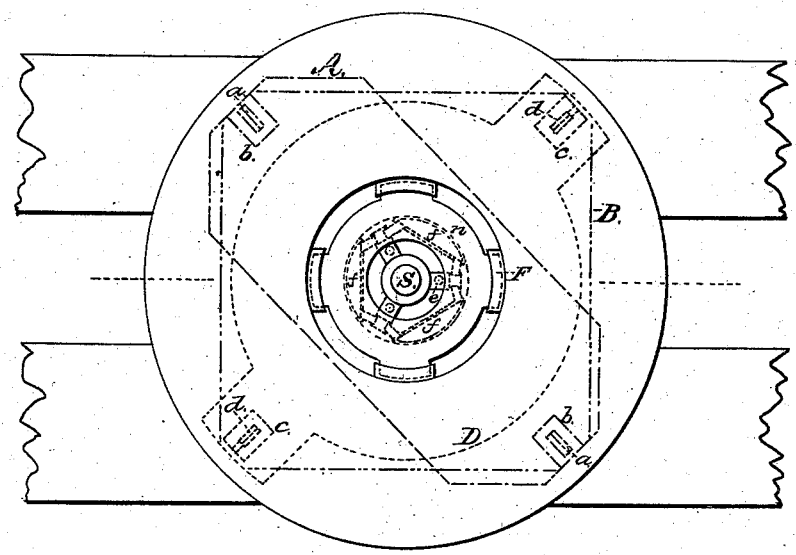
*Fig. 2.*
*Fig. 3.*
Witnesses:
Geo. N. Evans
Rich. K. Evans
Inventor:
Enoch Moore
David Moore
per atty. A. H. Evans & Co.

UNITED STATES PATENT OFFICE.

ENOCH MOORE AND DAVID MOORE, OF VINTON, IOWA.

IMPROVEMENT IN PACKING FOR MILL-SPINDLES.

Specification forming part of Letters Patent No. 187,663, dated February 20, 1877; application filed November 16, 1876.

*To all whom it may concern:*

Be it known that we, ENOCH MOORE and DAVID MOORE, of Vinton, Iowa, have invented certain new and useful Improvements in Grinding-Mills, of which the following is a full, clear, and exact description, reference being had to the accompanying drawings, making a part of this specification, in which—

Figure 1 represents a cross-section; Fig. 2, a plan view; Fig. 3, a detail referred to.

Our invention relates to rocking bed-stones; and it consists in the combination of devices hereinafter described and claimed.

To enable others skilled in the art to make and use our invention, we will proceed to describe the exact manner in which we have carried it out.

In the drawings, A represents a bed-plate, having a length nearly equal to the diameter of the bed-stone, and provided on each end with the bearing $a$ $a$, resting upon rubber or other suitable cushions $a'$, as shown in Fig. 3. This bed-plate rests diagonally upon a frame-work, as shown in Fig. 2.

The middle plate B, which rests with diagonal corners upon the bed-plate A, is provided with notched bearings $b$ $b$, fitting upon the bearings $a$ $a$, and on its upper surface, at the other diagonal corners, with notched bearings $c$ $c$, into which fit the lugs $d$ $d$ on the end of the plate D, which is attached to the lower face of the bed-stone, as shown in Fig. 1, thus bringing all the bearings of the universal joint under the skirt of the stone, for the purpose before mentioned, viz: to secure a light and easy oscillation.

From the center of the bed-plate A rises the triangular bushing E, recessed or slotted, as shown in Fig. 2, to receive the followers $e$, which are provided with the screw-rods $e'$, for the purpose of tightening the same. From the flat sides of the bushing are suspended the oil-reservoirs $f$, thereby avoiding the necessity and danger of passing the oil over the stone while lubricating. The grooves in which the followers travel have an incline on their surface, with corresponding incline on the back of the follower, as shown in Fig. 1, which construction affords a ready and effective means for tightening the followers around the spindle, while the followers are held firmly and solidly in position.

Our dust-tight eye is of novel construction.

A flanged ring, F, is inserted in the upper portion of the eye of the bed-stone, the flanges being in detached sections, and bent inwardly, as shown in Fig. 1. Upon this flanged ring is fitted a flexible disk, $i$, upon a metallic rim, this rim being cut away at points of its periphery corresponding to the detached sections of the flange in ring F, as shown in Fig. 2.

It is evident that by dropping the disk $i$ upon the metallic rim and giving the rim a partial revolution it will become securely locked by its projections passing under the sectional flanges of the ring F. Above the disk $i$ we wind sufficient cotton around the spindle for packing, and over this place another flexible disk, $m$, and upon this we place a metallic concavo-convex plate, $n$, resembling somewhat an inverted dinner-plate, and provided with projections upon its periphery fitting between the sectional flanges of the ring F. When these several parts are in position, the metallic plate $n$ is pressed down and partially revolved, when its projections pass under the sectional flanges of the ring F, and the whole is securely locked in position without the use of screw or key. The central opening in the metallic plate $n$ is sufficiently large to allow full play to the spindle S, while the central openings in the flexible disks fit the spindle closely.

We are aware that flexible and metallic disks have been combined to form a dust-tight eye, and we do not therefore claim, broadly, such a combination.

The object sought to be gained by the use of the rubber or other elastic cushions $a'$, as shown in Fig. 3, is to prevent any jar upon the frame-work being communicated to the bed-stone.

Having thus described our invention, what we claim as new, and desire to secure by Letters Patent, is—

The flanged ring F in the eye of the bed-stone, in combination with the flexible disks $i$ and $m$, and the metallic concavo-convex plate $n$, provided with projections on its periphery, all operating substantially as and for the purpose set forth.

ENOCH MOORE.
DAVID MOORE.

Witnesses:
W. C. CONNELL,
W. L. PARMATER.